United States Patent [19]

Shirley

[11] Patent Number: 5,515,638

[45] Date of Patent: May 14, 1996

[54] LIMIT LINE LINEAR FISH CATCHING DEVICE

[76] Inventor: Edward S. Shirley, P.O. Box 181, Queen City, Tex. 75572

[21] Appl. No.: 330,857

[22] Filed: Oct. 31, 1994

[51] Int. Cl.⁶ .................................................. A01K 97/00
[52] U.S. Cl. ................................................................ 43/15
[58] Field of Search ........................ 43/15, 44.95, 44.98, 43/44.92, 42.7, 42.72, 4, 100

[56] References Cited

U.S. PATENT DOCUMENTS

| | | | |
|---|---|---|---|
| 1,296,057 | 3/1919 | Ellsworth | 43/44.98 X |
| 1,438,476 | 12/1922 | Bley, Sr. | 43/44.98 X |
| 3,011,284 | 12/1961 | Sawyer | 43/42.72 |
| 3,060,615 | 10/1962 | Spets | 43/15 |
| 3,605,315 | 9/1971 | Adams et al. | 43/16 |
| 3,766,680 | 10/1973 | Torme et al. | 43/16 |
| 3,823,501 | 7/1974 | Bybee | 43/15 |
| 4,121,369 | 10/1978 | Lopez | 43/18 |
| 4,213,264 | 7/1980 | Robinson, Jr. | 43/16 |
| 4,471,553 | 9/1984 | Copeland | 43/15 |
| 4,924,617 | 5/1990 | Parent | 43/15 |
| 4,944,106 | 7/1990 | Wu et al. | 43/15 |
| 5,309,663 | 5/1994 | Shirley | 43/15 |

Primary Examiner—Richard K. Seidel
Assistant Examiner—Jeanne M. Elpel
Attorney, Agent, or Firm—Stephen D. Carver; Trent C. Keisling

[57] ABSTRACT

A limit line linear fish catching device having an elongated barrel and a coaxially disposed internal elastic spring humanely allows hooked fish to remain in the water until harvested. Preferably the elastic tube spring extends between a pair of spaced apart guiding elements coaxially centered within the device. A limit line interconnects both ends of the tube spring and limits the elongation of the spring. The limit line extends from the support through the device to the fishing line and interconnects the components of the device. The device is cocked by stretching the spring tube. The tube functions as a linear spring. The limit line from the bottom end of the barrel is secured by captivating a stop in a slot defined in the barrel end. When a fish strikes, the stop is dislodged from the slot, freeing the line. This action activates the spring which contracts and hooks the fish. Each coupling comprises a cylindrical body having a penetrable eyelet and a pair of aligned relief slots that provide clearance when the line is tied to the eyelet.

9 Claims, 4 Drawing Sheets

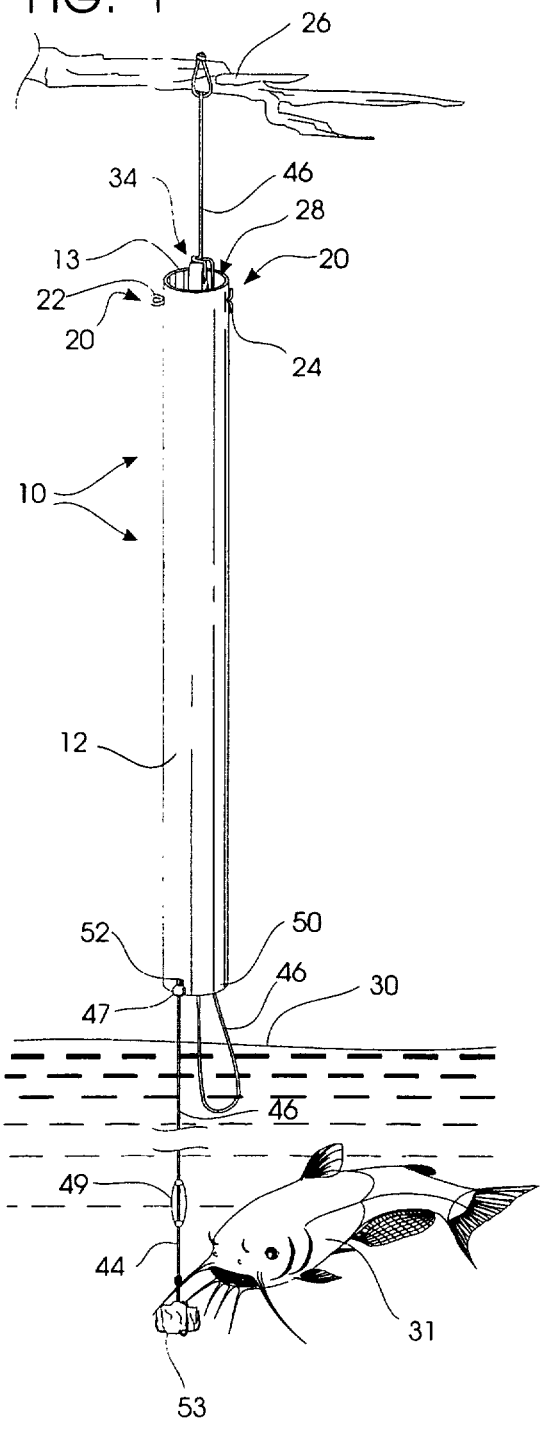
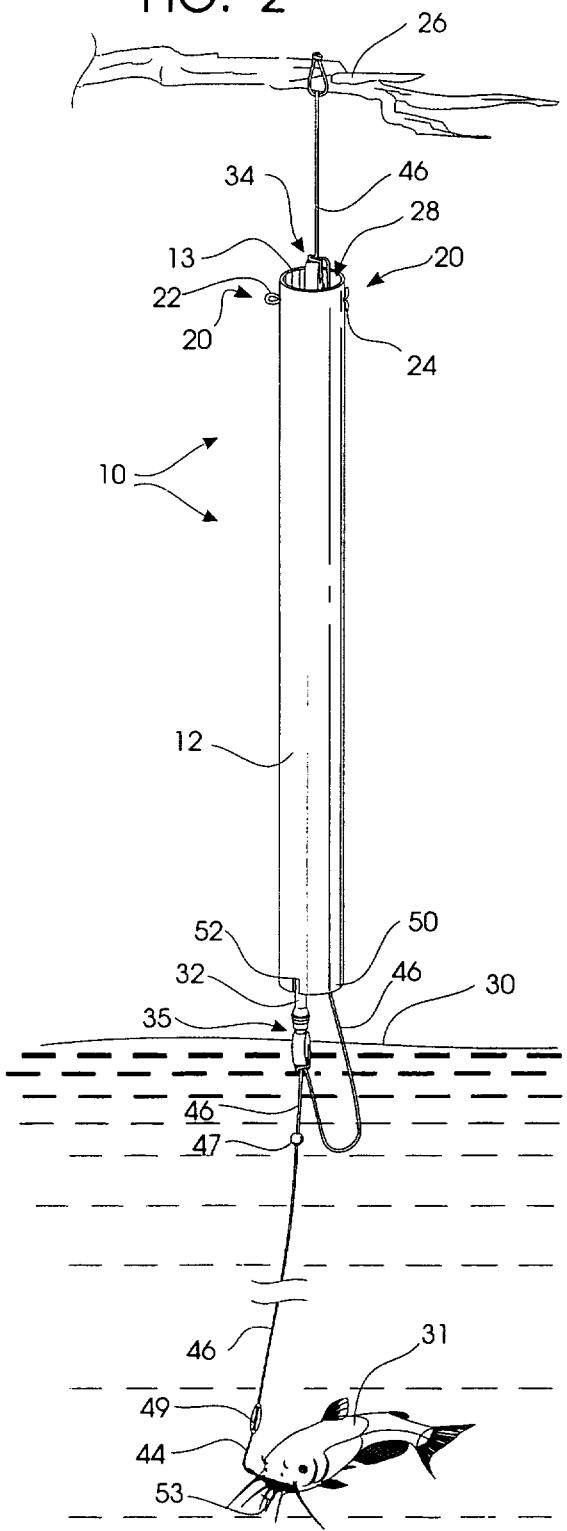

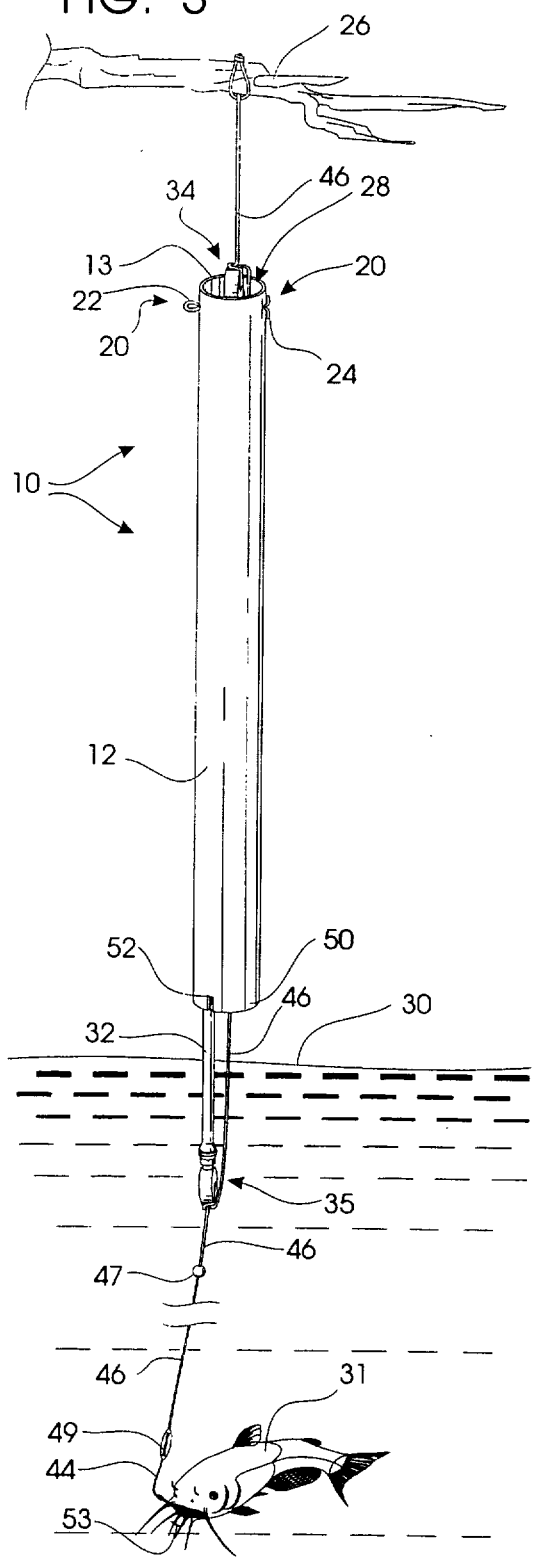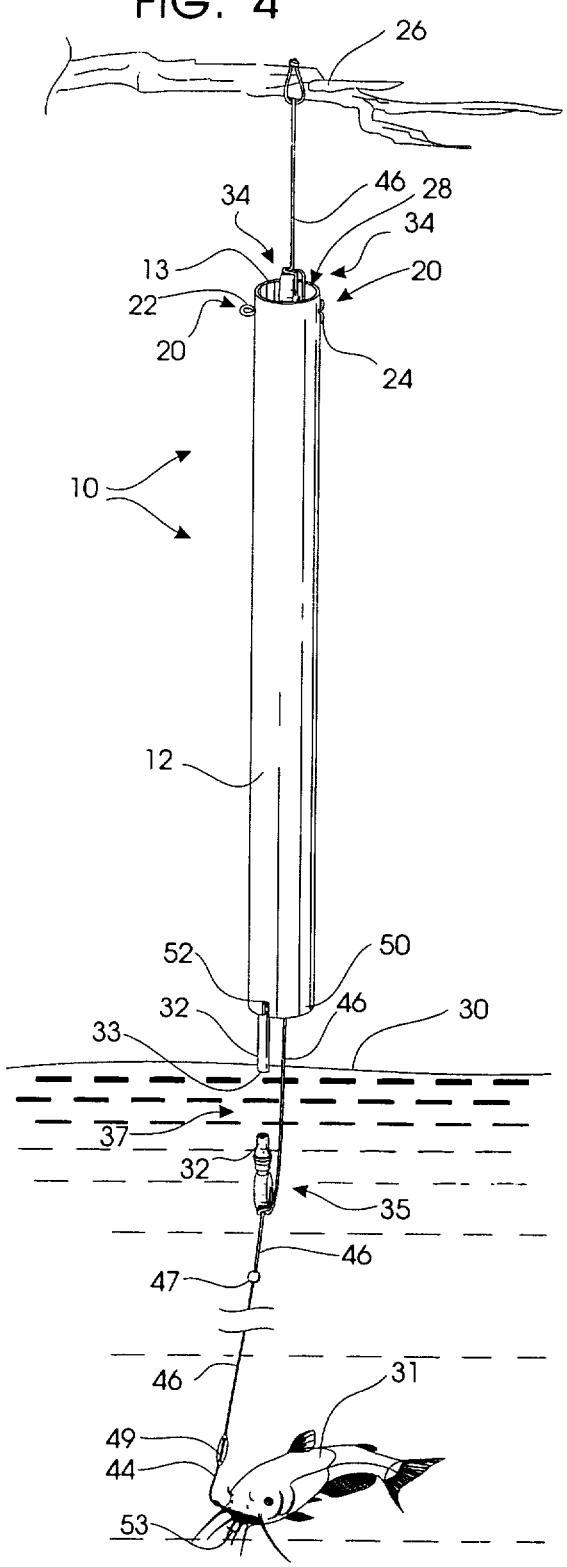

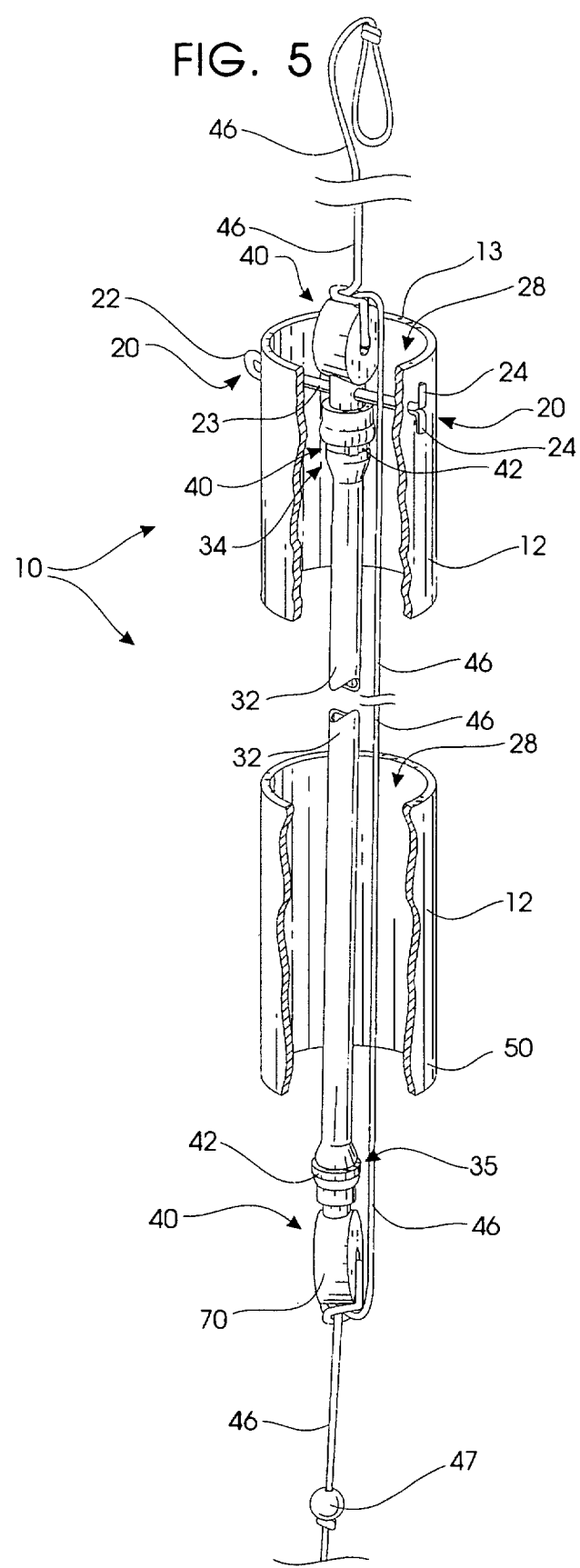

LIMIT LINE LINEAR FISH CATCHING DEVICE

BACKGROUND OF THE INVENTION

My invention relates generally to automatic fish catching, hooking and retrieval devices. More particularly, my invention relates to a limiting line for an automatic hooking device that humanely catches fish. Prior art pertinent to this invention is found in United States Class 43, subclasses 15–18.

A variety of fish catching devices are well known in the prior art. Rotary fish catching devices known as "Yo-Yo's" have been used for several years, especially in the American south. Yo-Yo's generally comprise a metal casing containing a spring activated spool with a fishing line. The line terminates in a baited hook. When a fish strikes, the spring winds the spool to tighten the line and hook the fish.

However, conventional round, metallic fishing yo-yo's have a number of disadvantages well known to fishermen. Prior art rotary Yo-Yo's often rust and deform because of the wet working environment, becoming corroded and jamming. They are also difficult to use because of their internal spring. Their metallic construction and precise tolerances also increase the cost of production.

Another problem with the prior art yo-yo's is their tendency to drag the hooked fish out of the water, resulting in a slow death. Many states have outlawed conventional yo-yo's because of this reason. To be humane and effective, a fish hooking and catching device must allow the captured fish to remain in the water until harvested.

Others have suggested fish retrieving and catching devices previously. U.S. Pat. No. 4,121,369, issued to Lopez on Oct. 24, 1978, discloses art that is relevant to my invention. This fishing rod encloses a coaxially centered elastic line that can hook a fish when triggered. However, numerous important differences exist between that device and my invention. One difference is the manner or mode in which the elastic trigger is deployed.

U.S. Pat. No. 4,924,617, issued May 15, 1990, to Parent discloses a hook setting device having a frame in which a lever is sprung for actuation. A bait line extends from a ball locked within a trigger seat. When a fish bites, the device triggers.

Adams U.S. Pat. No. 3,605,315 issued Sep. 20, 1971, discloses a relatively complex metallic line tensioner that is triggered when the fish initially bites. Some variations of this theme involve a holder wherein a conventional fishing rod is simply held in a mechanical device. An example of this is seen in U.S. Pat. No. 4,213,264 issued Jul. 22, 1980. Other examples of fish catching devices are seen in U.S. Pat. Nos. 4,471,553, 4,944,106, and 3,766,680.

However, no prior art retrieval device of which I am aware discloses a self contained elasticized trigger system that can be readily employed from a boat, tree or similar support or stationary object, or within a flotation device. Additionally, known prior art devices fail to precisely control or center the spring properly to continually present a coaxial pathway during spring retraction. The prior art also fails to protect the spring during operation and to facilitate the recovery of the device if the spring breaks.

My prior invention overcame several known problems in the prior art by combining an elastic spring centered within a coaxial tube that protects the mechanism. An application was filed on my previous invention and eventually issued as U.S. Pat. No. 5,309,663, filed Apr. 26, 1993, assigned to Examiner J. Elpel in Art Unit 3205, and issued on May 10, 1994.

However, the strength of my prior invention was limited by several design restrictions. In other words, the elastic tube used in my prior invention could conceivably be overextended during strenuous conditions. Such an overextension, if repeated numerous times, could conceivably result in the failure or breakage of the spring during operation.

My new invention is a limit line that prevents overextension or breakage of the spring. Thus, my invention prevents the loss of the components of the device or the fish and gives maximum strength to the device.

SUMMARY OF THE INVENTION

I have provided a limiting line for a linear fishing device in which an elongated barrel thoroughly encapsulates and shrouds an internal elastic spring. The limiting line comprises a line or string that attaches the fishing device to a tree or other attachment point and extends through the device to the hook. The line is tied to both ends of the spring and it restricts the extension of the elastic spring to prevent overextension and subsequent failure. Since the line interconnects all of the components of the device, the line prevents their loss if the spring breaks. Preferably, the spring comprises an elastic tube that is fitted between a pair of guiding elements coaxially centered within the device.

The device is set by stretching the elastic tube and catching a stop in a slot at one end of the barrel. The elastic tube functions as a linear spring. A limit line is tied to the elastic tube at both of its ends. The end of the limit line tied to the top of the elastic tube and extending from the top of the barrel is tied to a tree or other protrusion to support the device.

The end of the limit line emanating from the bottom of the tube has a stop placed on it at a desired point. When the stop is captivated by a slot in the barrel, the device is set and the line cannot be retracted. Once a fish bites, the line or leader is dislodged from the slot, freeing the stop. The elastic spring retracts to set the hook in the fish. The limit line serves to prevent the fish from stretching or elongating the spring too much and to keep the components of the device together if the spring breaks.

Preferably the spring is an elastic, rubber tube coupled at each terminal end to identical plastic couplings. A continuous line ties to each of the plastic couplings. The length of the line between these two couplings is slightly less than the desired maximum extended length of the spring. This portion of the line serves to limit or restrict the elongation or stretching of the tube. The line extends to the hook or is attached to a fishing leader. The line is thus pivotally interconnected with the spring, and the spring itself is coaxially pivoted interiorly of the barrel. The fittings help maintain the spring tube coaxially centered within the barrel, to prevent jamming.

As a result of the inherent coaxial alignment of the various fittings as they are connected to the spring tube, I have provided an inherently reliable, jam proof linear fish catching device that does not corrode, that is highly reliable, and that is easily triggered when the fish strikes. The limit line prevents overextension of the spring. The line also ensures the retrieval of the components of the device to avoid potential pollution of the lake or river.

Thus an object of my invention is to provide a noncorrosive, relatively inexpensive fish catcher that can be used by fishermen for catching fish.

An important object is to provide a humane automatic fish catching device.

A fundamental object is to provide a reliable fish catching device that allows the hooked fish to stay in the water while preventing the fish from overextending the spring.

A related object is to provide a linear fish catcher of the character described that can easily substitute for the well known rotary Yo-Yo's in common use in the American South.

A still further object of the present invention is to provide a jam-proof, linear fish catching device in which internal elements are prevented from binding or jamming within the apparatus.

Another object of the present invention is to provide a reliable and inexpensive fish hooking device of the character described that can be used in a wide variety of real-world outdoor situations.

A still further object is to provide a device of the character described that is inherently resistant to corrosion, that is ozone resistant, and in which dirt and debris do not accumulate through normal use.

Yet another object is to provide a fish catching device of the character described that can easily be set in the dark with the minimum of effort by the fisherman.

Another object is to provide a limiting line that extends continuously from a fish hook to a point of attachment.

A still further object is to provide a device of the character described that resists spring degradation, deformation and failure.

Another basic object is to provide a device of the character described that is easily repaired.

These and other objects and advantages of the present invention, along with features of novelty appurtenant thereto, will appear or become apparent in the course of the following descriptive sections.

BRIEF DESCRIPTION OF THE DRAWINGS

In the following drawings, that form a part of the specification and which are to be construed in conjunction therewith, and in which like reference numerals have been employed throughout wherever possible to indicate like parts in the various views:

FIG. 1 is a fragmentary pictorial view illustrating use of a Limit Line Linear Fish Catching Device, with the device deployed for catching a fish;

FIG. 2 is a fragmentary pictorial view thereof, illustrating the device as it appears after a fish has been hooked;

FIG. 3 is a fragmentary pictorial view thereof, illustrating the device as it appears as the fish stretches the elastic spring;

FIG. 4 is a fragmentary pictorial view thereof, illustrating the device as it appears in the event the fish breaks the elastic spring;

FIG. 5 is a greatly enlarged, fragmentary view of the device with pieces broken away or removed for clarity;

DETAILED DESCRIPTION OF THE DRAWINGS

Figure 6:
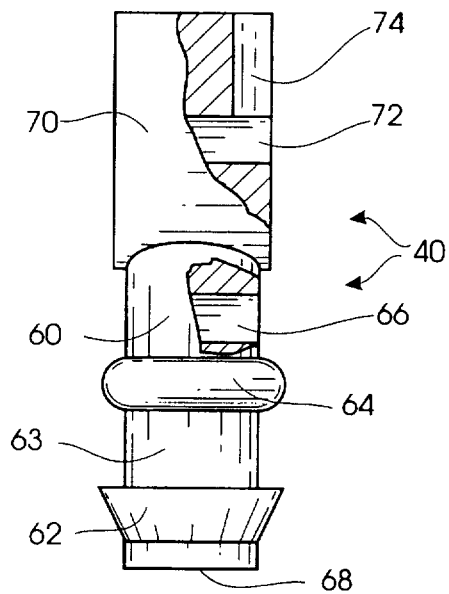
FIG. 6 is a greatly enlarged, fragmentary side elevational view of the preferred coupling with pieces broken away or removed for clarity.

Referring to FIGS. 1–2 of the appended drawings, my Limit Line Linear Fish Catching Device has been generally designated by the reference numeral 10. Device 10 preferably comprises a tubular elongated barrel 12 made of plastic or a similar corrosion resistant material. The barrel 12 includes an upper end 13 that is preferably penetrated by a cotter pin 20. Pin 20 comprises a loop portion 22 and an integral transverse portion 23 that penetrates barrel 12. The loop portion 22 facilitates storage of the device 10 in an upright position to avoid entanglement of the line 46. The pin 20 is easily removed by conventionally bending legs 24 inwardly. This permits the withdrawal of the pin 20 to facilitate repairs.

The line 46 attaches the device 10 to a convenient support, such as branch 26. Once mounted above the water 30, the line 46 will be deployed as described hereinafter to catch a fish 31.

Barrel 12 preferably comprises a generally annular interior 28 defined between its outer body and an elongated elastic spring, generally designated by the reference numeral 32. An elastic, spring-like tube 32 is formed of medical grade rubber, synthetic rubber or the like. The tube 32 terminates in a pair of spaced apart ends 34, 35, that are stretched over a pair of internal couplings 40.

The tube 32 stretches over the shank 60 of each coupling and fastens thereto with a suitable clamp 42. A coupling 40 is inserted at each end 34, 35 of the tube 32. One coupling 40 inserts adjacent the top of the device 10 and a second coupling 40 inserts at the end 35 adjacent the bottom of the device 10. The top coupling 40 is swiveled within the barrel 12 by transverse portion 23 of pin 20. The transverse portion 23 penetrates an eyelet 66 formed in shank 60.

Figure 7:
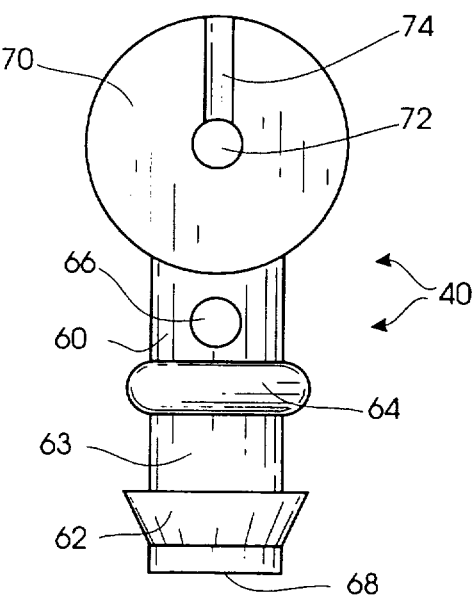
FIG. 7 is a front plan view of a the coupling in FIG. 6.
Figure 8:
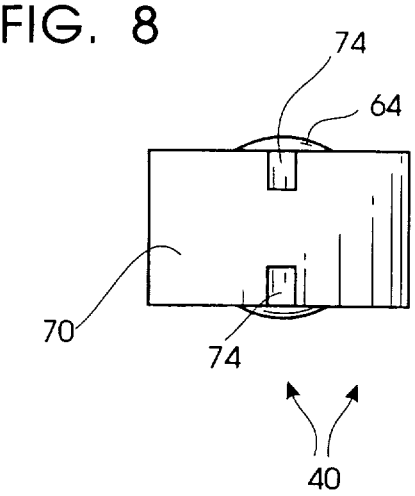
FIG. 8 is a top plan view of the coupling in FIG. 6.
Figure 9:
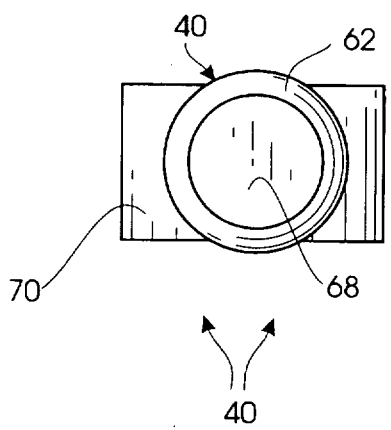
FIG. 9 is a bottom plan view of the coupling in FIG. 6.

FIGS. 6–9 illustrate a preferred coupling 40. Coupling 40 comprises a generally elongated and tubular plastic shank 60 of a generally uniform diameter. Shank 60 comprises a barbed ring portion 62 having an outer diameter greater than the diameter of its body, and a spaced apart second ring portion 64. A portion of the shank designated by the reference numeral 63 is disposed between rings 62 and 64. Ring 62 provides a "one way" action when the end of the elastic tube 32 is drawn over it. Therefore, when either end 34, 35 of the elastic tube 32 is drawn over end 68 of coupling 40, the coupling 40 is frictionally held inside tube 32. Thereafter, a clamp 42 is affixed exteriorly of region 63, to firmly lock the tube in place.

Shank 60 further comprises an eyelet 66 that swivel mounts the elastic tube 32 to pin 20 within the barrel 12. Shank 60 also includes an upper tab 70 having a penetrable eyelet 72 and a pair of aligned slots 74. The eyelet 72 provides a channel so that line 46 may be tied to both ends 34, 35 of the tube 32.

The line 46 is conventional and may be made of metal, heavy nylon or plastic line or the like. The line 46 may include a standard clasp 49 for attachment of a separate fish line 44. A stop 47 is secured to the line 46. As can best be seen in FIGS. 1–4, as the elastic tube 32 is extended, stop 47 will travel out of the barrel bottom 50. To cock the apparatus a portion of the line or leader is placed in slot bottom 52 defined in end 50. By then releasing the line, the elastic tube 32 will draw the line back into the barrel riding over slot 52 until stop 47 engages slot 52.

As soon as a fish strikes, moderate pressure on the line 46 will extend the elastic tube 32, withdrawing the stop 47 adjacent slot 52 and triggering the device 10. At this time the tube 32 contracts, at least partially drawing the line 46 and the hook or bait 53 borne thereby inwardly of the barrel. The fish is hooked by this process. However, it is not drawn out of the water by the action of the device 10.

Of course, the elastic tube 32 maintains pressure upon the fish so that the line will not be broken and the angler may return to unhook and harvest the fish. As the tube 32 stretches, the line 46 restricts or limits the tube elongation.

The line 46 is tied to both couplings 40 by threading the line through eyelet 72 and looping the line into a simple knot. The length of line 46 between the two couplings should be slightly less than the maximum desired stretched length of the tube 32. Therefore, the line 46 will limit the stretching or elongation of the tube 32, generally preventing its failure.

In the unlikely event that the tube 32 breaks 37, as shown in FIG. 4, the line 46 will retain the fish and the components of the device 10 so they may still be retrieved. This prevents undesirable pollution of the fishing area.

Retention of the components of the device 10 also facilitates the subsequent repair of the device 10. If the tube 32 does break 37, it is a simple matter to remove the pieces of tube around the coupling 40 and reinsert the coupling 40 into the new end 33 of tube 32 to repair the device 10. Also, repairs may be effectuated upon the device 10 by removing the cotter pin 20. The entire inner assembly may be removed from the barrel 12 to facilitate repairs.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A linear fishing device comprising:
   an elongated, generally tubular barrel adapted to be secured to a stationary support;
   an elongated spring generally coaxially disposed within said barrel, said spring having first and second spaced apart terminal ends;
   a first coupling pivotally connecting said first end of said spring within said barrel;
   a second coupling connected to said second end of said spring;
   said first and second couplings each comprising an elongated body comprising a penetrable orifice and a spring receptive end secured to said spring;
   a fish line emanating from said barrel and terminating in bait;
   limit means disposed within said barrel for restricting the maximum elongation of said spring, said limit means comprising a limit line of predetermined length connected between said first and second couplings; and,
   means for temporarily cocking said device until a fish bites.

2. The device as defined in claim 1 wherein said limit line is integral with said fish line.

3. The device as defined in claim 2 wherein said fish line comprises:
   an elongated, integral line extending at one end exteriorly of said barrel for attachment to said support;
   an integral intermediate portion defined as said limit line, wherein said limit line is tied to each of said couplings; and,
   an integral external portion exiting from said barrel and connected to said bait.

4. An automatic fishing device for hooking a fish, said device comprising:
   an elongated, generally tubular barrel adapted to be secured to a stationary support;
   an elongated elastic tube generally coaxially disposed within said barrel, said tube having a pair of spaced apart terminal ends;
   a first coupling securing said first end of said tube within said barrel;
   a second coupling secured to a second end of said tube;
   a fish line extending from said device terminating in at least one hook;
   limit means disposed within said barrel and connected between said couplings for limiting tube elongation; and,
   means for temporarily cocking said device until a fish bites, said cocking means comprising a line-receptive slot defined in said barrel and a stop on said line for engaging said slot until a fish strikes; and,
   said first and second couplings each comprising an elongated body comprising a pivotally mounted end having a penetrable orifice and a tube receptive end secured to ends of said elastic tube.

5. The device as defined in claim 4 wherein each of said limit means comprises a limit line of predetermined length.

6. The device as defined in claim 5 wherein said limit line is integral with said fish line.

7. The device as defined in claim 6 wherein said fish line comprises:
   an elongated, integral line extending at one end exteriorly of said barrel for attachment to said support;
   an integral intermediate portion defined as said limit line, wherein said limit line is tied to each of said couplings; and,
   an integral external portion exiting from said barrel and connected to said bait.

8. The device as defined in claim 7 wherein each of said couplings comprises a first ring portion for engaging said elastic tube, a second ring portion, and a clamp portion disposed between said ring portions.

9. A fishing device for automatically hooking a fish having a fish line terminating with bait, said device comprising:
   an elongated, generally tubular barrel having a top and a bottom;
   an elongated elastic tube generally coaxially disposed within said barrel that can be stretched to cock said device, said tube having a first end secured within said barrel and a second end;
   a first coupling comprising a pivotally mounted end having a penetrable orifice secured within said barrel at the top thereof and a tube receptive end comprising a first and second increased diameter portion, and a clamp disposed between said first and second portions;
   a second coupling comprising a pivotally mounted end having a penetrable orifice and a tube receptive end comprising a first and second increased diameter portion, and a clamp disposed between said first and second portions;
   a limit line integral with said fish line, and said fish line comprising an elongated, integral line extending at one end exteriorly of said barrel for attachment to said support and an integral intermediate portion defined as said limit line, wherein said limit line is tied to each of said couplings and an integral external portion exiting from said barrel and connected to said bait, whereby said limit line restricts the elongation of said tube;

slot means defined in said barrel for temporarily receiving at least a portion of said fish line when said device is cocked; and, a stop secured to said fish line for yieldably locking against said slot until a fish strikes, whereupon said fish line escapes said slot and said elastic tube contracts to hook said fish.

* * * * *